(No Model.)  3 Sheets—Sheet 1.

F. W. ROBINSON.
GRAIN AND SEED THRASHER.

No. 267,257.  Patented Nov. 7, 1882.

Witnesses
Larry M. Yeo
H. E. Robinson

Inventor.
Francis W. Robinson (No Model.) 3 Sheets—Sheet 2.

F. W. ROBINSON.
GRAIN AND SEED THRASHER.

No. 267,257. Patented Nov. 7, 1882.

Witnesses.
Harry M. Yeo
H. E. Robinson

Inventor.
Frances W. Robinson (No Model.)

F. W. ROBINSON.

GRAIN AND SEED THRASHER.

No. 267,257.  Patented Nov. 7, 1882.

3 Sheets—Sheet 3.

WITNESSES
Fred. G. Dieterich.
F. L. Dieterich.

INVENTOR
Francis W. Robinson
by DeWitt C. Allen, Attorney

UNITED STATES PATENT OFFICE.

FRANCIS W. ROBINSON, OF RICHMOND, INDIANA.

GRAIN AND SEED THRASHER.

SPECIFICATION forming part of Letters Patent No. 267,257, dated November 7, 1882.

Application filed December 8, 1881. (No model.)

*To all whom it may concern:*

Be it known that I, FRANCIS W. ROBINSON, of Richmond, in the county of Wayne and State of Indiana, have invented certain new and useful Improvements in Grain and Seed Thrashers, of which the following is a specification.

My invention relates to certain new and useful improvements in thrashing-machines, in which I am enabled to thoroughly thrash clover and other small seeds, as well as grain; and to this end the invention consists in a novel combination and arrangement of parts, all as will be hereinafter fully described, and set forth in the claim hereto annexed.

Figure 1:
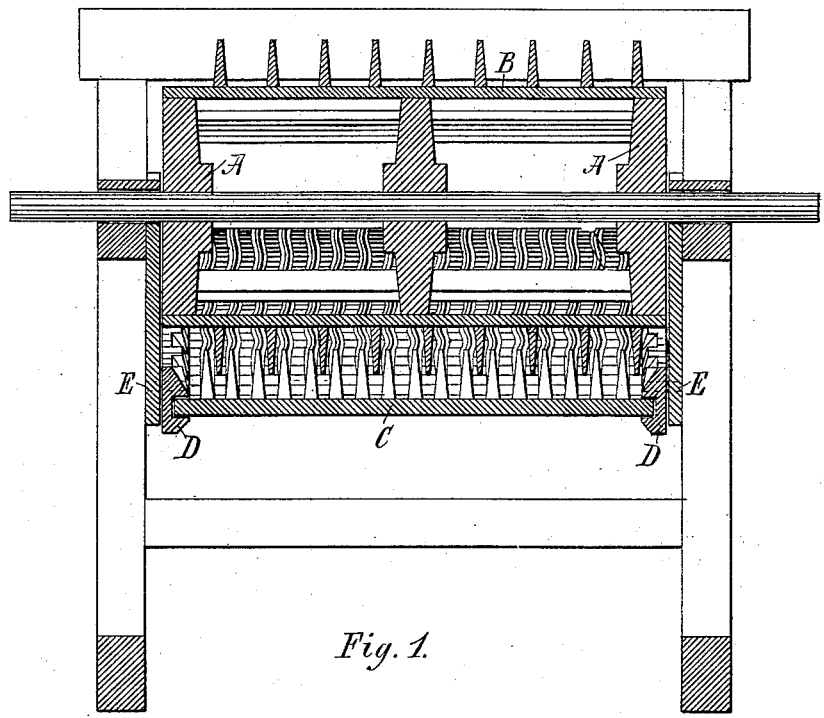
Figure 2:
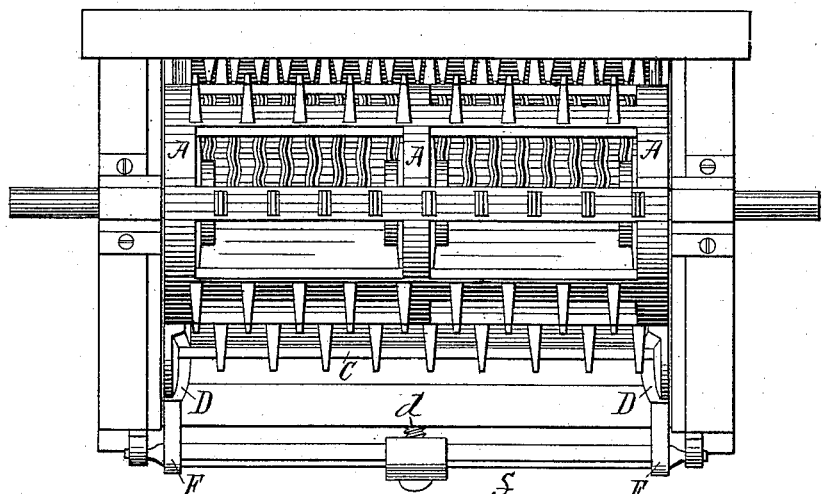
Figure 3:
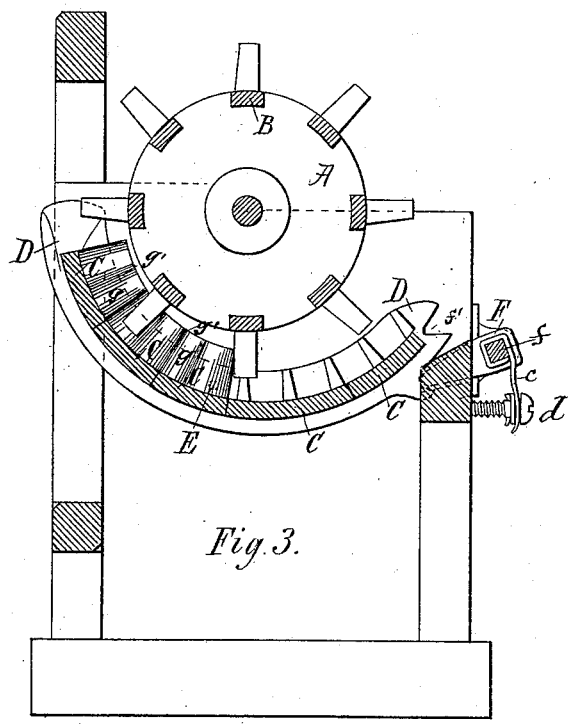
Figure 4:
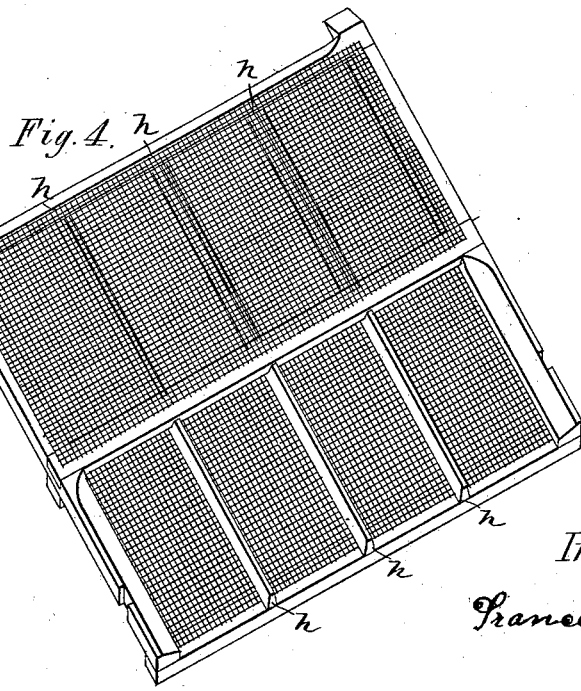
Figure 5:
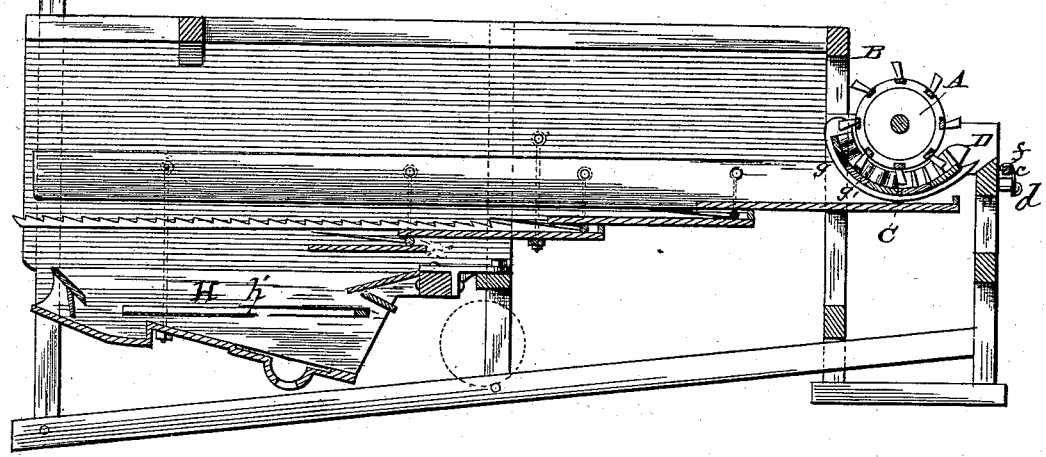
Figure 6:
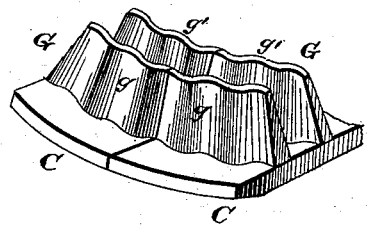

Referring to the accompanying drawings, Figure 1 represents a longitudinal sectional elevation. Fig. 2 is a top view. Fig. 3 is a transverse section. Fig. 4 is a view in perspective of a screen used in my improved machine; Fig. 5, a longitudinal vertical section through a thrashing-machine and separator embodying my improvements; Fig. 6, a detached perspective view, showing more clearly the construction of the ribs of the concave.

In the drawings, A represents the common toothed thrashing-cylinder, and B a section of the frame.

C represents the sections of the thrashing-concave, partly without the ribs or teeth, and D the segmental concave plates or holders, provided with segmental or curved grooves for the reception of the plates of the concave carrying the teeth and ribs.

E E represent the pivotal points of the segmental plates or holders, and F F the arms of the concave-adjuster, which are fitted in suitable notches, $f'$, in the forward ends of the segmental plates or holders D D, said arms F F being mounted upon a pivoted shaft, $f$, which may be turned in any desired position through the medium of connecting-strap $c$ and set-screw $d$, as clearly shown in Fig. 3.

The concave differs from the thrashing-concaves now in common use, as in the place of the common teeth or straight ribs having serrations on the vertical sides I employ fluted ribs G, in which the flutes or corrugations $g$ on each side form vertical curved or rounded projections or beads $g'$ on the other side, whereby irregular-shaped ribs, with alternating vertical concave and convex surfaces, are produced on both sides thereof, said ribs being arranged at such distances apart as to permit the teeth of the thrashing-cylinder to pass between them.

The object of the vertical curved or rounded beads $g$ is to prevent the seed from being crushed or broken during the operation of thrashing or hulling the same, said beads permitting the seed to readily roll over them with sufficient frictional or rubbing action (through the medium of the teeth of the cylinder) to hull and not crush or break the seed.

The entire concave may be filled with the fluted sections, or one or more common toothed or plain blank sections may be interposed, as the condition of the straw or seed may require.

The segmental plates or holders D D, being attached at their forward ends to the device for raising and lowering the same, extend backward and upward to a line nearly as high as the axial or pivotal center of the cylinder, and are pivoted to the sides of the frame, as shown.

H represents a riddle, to be used in the place of the screens usually employed in the separating-shoe, said riddle having wire-cloth or perforated metal of suitable mesh on the top half of the frame, with supporting-ribs $h$, and the other half having the wire-cloth or perforated metal on the under side of the frame connected to supporting-ribs above it, thus leaving a space, $h'$, for permitting a strong overblast to the rear part of the screen, all as clearly shown in Figs. 4 and 5.

To operate my improved attachment when the seed is dry and easy to hull out, the concave is placed about an equal distance from the cylinder teeth and ribs at front and rear. If the seed is extremely dry and easy to hull, the front of the concave is raised, so as to allow the seed to pass out rearward with but little resistance. Should, however, the condition of the seed be the reverse, the concave is lowered in front, which raises it at the rear or back, bringing it nearer the cylinder-teeth, thus packing and holding the straw for more thorough rubbing. With my improvement these changes can be made while the machine is in operation.

I do not claim in this case the peculiar construction of separating-riddle, as that will form the subject-matter of a separate application.

I am aware that a concave provided with corrugated or zigzag transverse ribs is old, and such I do not wish to be understood as claiming broadly as of my invention.

Having thus fully described my invention, what I claim as new, and desire to secure by Letters Patent, is—

The combination, with the toothed thrashing-cylinder, of the thrashing-concave having its front portion provided with teeth and its rear portion with transverse fluted or corrugated ribs, the pivoted segmental concave plates or holders having their rear ends extending to a point above their front ends, and means for adjusting said plates or holders, substantially in the manner as and for the purpose herein shown and described.

FRANCIS W. ROBINSON.

Witnesses:
JOSEPH A. FAGAN,
HARRY M. YEO.